(12) United States Patent
Van Phan et al.

(10) Patent No.: US 10,299,115 B2
(45) Date of Patent: May 21, 2019

(54) SELECTION AND USE OF A SECURITY AGENT FOR DEVICE-TO-DEVICE (D2D) WIRELESS COMMUNICATIONS

(71) Applicant: Nokia Solutions and Networks Oy, Espoo (FI)

(72) Inventors: Vinh Van Phan, Oulu (FI); Ling Yu, Kauniainen (FI)

(73) Assignee: Nokia Solutions and Networks Oy, Espoo (FI)

(*) Notice: Subject to any disclaimer, the term of this patent is extended or adjusted under 35 U.S.C. 154(b) by 169 days.

(21) Appl. No.: 15/029,202

(22) PCT Filed: Oct. 18, 2013

(86) PCT No.: PCT/EP2013/071879
§ 371 (c)(1),
(2) Date: Apr. 13, 2016

(87) PCT Pub. No.: WO2015/055257
PCT Pub. Date: Apr. 23, 2015

(65) Prior Publication Data
US 2016/0255501 A1 Sep. 1, 2016

(51) Int. Cl.
*H04L 29/06* (2006.01)
*H04W 12/04* (2009.01)
(Continued)

(52) U.S. Cl.
CPC ......... *H04W 12/04* (2013.01); *H04L 63/0435* (2013.01); *H04L 63/20* (2013.01);
(Continued)

(58) Field of Classification Search
CPC ... H04W 12/04; H04W 76/028; H04W 12/06; H04W 24/04; H04W 74/00;
(Continued)

(56) References Cited

U.S. PATENT DOCUMENTS

| 2013/0035033 A1* | 2/2013 | Sanneck | ............... H04W 24/04 455/9 |
| 2013/0083650 A1* | 4/2013 | Taleb | ...................... H04W 8/30 370/218 |

(Continued)

FOREIGN PATENT DOCUMENTS

| WO | 2011117677 | 9/2011 |
| WO | 2013022471 | 2/2013 |

OTHER PUBLICATIONS

Gábor Fodor; Design Aspects of Network Assisted Device-to-Device Communications; IEEE Communications Magazine o Mar. 2012; p. 170-177.*

(Continued)

*Primary Examiner* — Monjur Rahim
(74) *Attorney, Agent, or Firm* — Brake Hughes Bellermann LLP

(57) ABSTRACT

A technique is provided for receiving, by a MS from a BS a failure notification message indicating a failure of a BS-core network interface, sending, from the MS to the BS, a security agent (SA) notification including a MSID identifying the MS, a service profile identifying one or more services, and one or more user group IDs that identify one or more user groups of which the MS is a member, and receiving, by the MS from the BS, a SA configuration message including a service identification identifying at least one of the one or more services, one or more user group IDs identifying one or more user groups for which the MS has been configured as a security agent to perform the identified service, and a BS access key to allow one or more other MSs to access or establish a connection with the BS.

20 Claims, 7 Drawing Sheets

(51) Int. Cl.
*H04W 76/19* (2018.01)
*H04W 74/00* (2009.01)
*H04W 92/12* (2009.01)
*H04W 24/04* (2009.01)
*H04W 12/06* (2009.01)
*H04L 29/14* (2006.01)
*H04W 76/23* (2018.01)

(52) U.S. Cl.
CPC ......... *H04W 76/19* (2018.02); *H04L 63/0492* (2013.01); *H04L 63/065* (2013.01); *H04L 69/40* (2013.01); *H04W 12/06* (2013.01); *H04W 24/04* (2013.01); *H04W 74/00* (2013.01); *H04W 76/23* (2018.02); *H04W 92/12* (2013.01)

(58) Field of Classification Search
CPC ................ H04W 76/043; H04W 92/12; H04L 63/0435; H04L 63/20; H04L 63/0492; H04L 63/065; H04L 69/40
USPC .......................................................... 713/153
See application file for complete search history.

(56) References Cited

U.S. PATENT DOCUMENTS

| | | | |
|---|---|---|---|
| 2014/0080500 A1* | 3/2014 | Iwamura | H04W 76/043 455/452.1 |
| 2014/0106707 A1* | 4/2014 | Bontu | H04W 76/023 455/410 |
| 2014/0199969 A1* | 7/2014 | Johnsson | H04W 56/00 455/411 |
| 2014/0206348 A1* | 7/2014 | Johnsson | H04W 8/005 455/434 |
| 2014/0321367 A1* | 10/2014 | Marupaduga | H04W 72/048 370/329 |
| 2015/0156165 A1* | 6/2015 | Lindoff | H04W 8/005 370/329 |
| 2015/0249931 A1* | 9/2015 | Casati | H04L 63/0853 455/411 |

OTHER PUBLICATIONS

International Search Report received for corresponding Patent Cooperation Treaty Application No. PCT/CN2010/076876, dated Aug. 26, 2014, 5 pages.

* cited by examiner

SELECTION AND USE OF A SECURITY AGENT FOR DEVICE-TO-DEVICE (D2D) WIRELESS COMMUNICATIONS

RELATED APPLICATION

This application was originally filed as PCT Application No. PCT/EP2013/071879 filed Oct. 18, 2013

TECHNICAL FIELD

This description relates to wireless networks.

BACKGROUND

A communication system may be a facility that enables communication between two or more nodes or devices, such as fixed or mobile communication devices.

Signals can be carried on wired or wireless carriers.

An example of a cellular communication system is an architecture that is being standardized by the $3^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations, which are referred to as enhanced Node Bs (eNBs), provide wireless access within a coverage area or cell. In LTE, mobile devices, or mobile stations are referred to as user equipment (UE). LTE has included a number of improvements or developments.

SUMMARY

According to an example implementation, a method may include detecting, by a base station (BS), a failure of an interface between the BS and a core network (BS-core network interface), sending, by the BS, a failure notification message to one or more mobile stations (MSs) of a cell indicating the failure of the BS-core network interface, selecting, by the BS, one of the MSs to be a security agent (SA), and sending a SA configuration message to one or more of the MSs, the SA configuration message including a service identification identifying at least one of the one or more services, one or more user group IDs identifying one or more user groups for which the MS has been configured as a security agent to perform the identified service, and a BS access key to allow one or more other MSs to access or establish a connection with the BS.

According to another example implementation, an apparatus may include at least one processor and at least one memory including computer instructions, when executed by the at least one processor, cause the apparatus to: detect, by a base station (BS), a failure of an interface between the BS and a core network (BS-core network interface), send, by the BS, a failure notification message to one or more mobile stations (MSs) of a cell indicating the failure of the BS-core network interface, selecting, by the BS, one of the MSs to be a security agent (SA), and send a SA configuration message to one or more of the MSs, the SA configuration message including a service identification identifying at least one of the one or more services, one or more user group IDs identifying one or more user groups for which the MS has been configured as a security agent to perform the identified service, and a BS access key to allow one or more other MSs to access or establish a connection with the BS.

According to another example implementation, a computer program product is provided that includes a non-transitory computer-readable storage medium and storing executable code that, when executed by at least one data processing apparatus, is configured to cause the at least one data processing apparatus to perform a method including: detecting, by a base station (BS), a failure of an interface between the BS and a core network (BS-core network interface), sending, by the BS, a failure notification message to one or more mobile stations (MSs) of a cell indicating the failure of the BS-core network interface, selecting, by the BS, one of the MSs to be a security agent (SA), and sending a SA configuration message to one or more of the MSs, the SA configuration message including a service identification identifying at least one of the one or more services, one or more user group IDs identifying one or more user groups for which the MS has been configured as a security agent to perform the identified service, and a BS access key to allow one or more other MSs to access or establish a connection with the BS.

According to an example implementation, a method may include receiving, by a mobile station (MS) from a base station (BS), a failure notification message indicating a failure of a BS-core network interface, sending, from the MS to the BS, a security agent (SA) notification, the SA notification including at least a MSID identifying the MS, a service profile identifying one or more services that the MS can perform, and one or more user group IDs that identify one or more user groups of which the MS is a member, and receiving, by the MS from the BS, a SA configuration message including a service identification identifying at least one of the one or more services, one or more user group IDs identifying one or more user groups for which the MS has been configured as a security agent to perform the identified service, and a BS access key to allow one or more other MSs to access or establish a connection with the BS.

According to another example implementation, an apparatus may include at least one processor and at least one memory including computer instructions, when executed by the at least one processor, cause the apparatus to: receive, by a mobile station (MS) from a base station (BS), a failure notification message indicating a failure of a BS-core network interface, send, from the MS to the BS, a security agent (SA) notification, the SA notification including at least a MSID identifying the MS, a service profile identifying one or more services that the MS can perform, and one or more user group IDs that identify one or more user groups of which the MS is a member, and receive, by the MS from the BS, a SA configuration message including a service identification identifying at least one of the one or more services, one or more user group IDs identifying one or more user groups for which the MS has been configured as a security agent to perform the identified service, and a BS access key to allow one or more other MSs to access or establish a connection with the BS.

According to another example implementation, a computer program product is provided that includes a non-transitory computer-readable storage medium and storing executable code that, when executed by at least one data processing apparatus, is configured to cause the at least one data processing apparatus to perform a method including: receiving, by a mobile station (MS) from a base station (BS), a failure notification message indicating a failure of a BS-core network interface, sending, from the MS to the BS, a security agent (SA) notification, the SA notification including at least a MSID identifying the MS, a service profile identifying one or more services that the MS can perform, and one or more user group IDs that identify one or more user groups of which the MS is a member, and receiving, by the MS from the BS, a SA configuration message including a service identification identifying at least one of the one or more services, one or more user group IDs identifying one or more user groups for which the MS has been configured as a security agent to perform the identified service, and a BS access key to allow one or more other MSs to access or establish a connection with the BS.

According to an example implementation, a method may include receiving, by a base station (BS), a connection establishment request from a mobile station (MS) that includes a plurality of fields including at least a MSID that identifies the MS and one or more user group IDs to identify one or more user groups for which the MS is a member, at least one of the fields being encrypted with a key, associating, by the BS, at least one user group ID of the one or more user group IDs in the connection establishment request with a security agent, sending, based on the associating, an authentication request from the BS to the security agent to request the security agent to authenticate the MS, the authentication request including at least the field encrypted based on the key, receiving, by the BS from the security agent, an authentication response indicating that the MS has been authenticated and is permitted to establish a connection to the BS, and sending, by the BS to the MS in response to receiving the authentication response, a connection establishment response indicating that the requested connection to the BS has been established.

According to another example implementation, an apparatus may include at least one processor and at least one memory including computer instructions, when executed by the at least one processor, cause the apparatus to: receive, by a base station (BS), a connection establishment request from a mobile station (MS) that includes a plurality of fields including at least a MSID that identifies the MS and one or more user group IDs to identify one or more user groups for which the MS is a member, at least one of the fields being encrypted with a key, associate, by the BS, at least one user group ID of the one or more user group IDs in the connection establishment request with a security agent, send, based on the associating, an authentication request from the BS to the security agent to request the security agent to authenticate the MS, the authentication request including at least the field encrypted based on the key, receive, by the BS from the security agent, an authentication response indicating that the MS has been authenticated and is permitted to establish a connection to the BS, and send, by the BS to the MS in response to receiving the authentication response, a connection establishment response indicating that the requested connection to the BS has been established.

According to another example implementation, a computer program product is provided that includes a non-transitory computer-readable storage medium and storing executable code that, when executed by at least one data processing apparatus, is configured to cause the at least one data processing apparatus to perform a method including: receiving, by a base station (BS), a connection establishment request from a mobile station (MS) that includes a plurality of fields including at least a MSID that identifies the MS and one or more user group IDs to identify one or more user groups for which the MS is a member, at least one of the fields being encrypted with a key, associating, by the BS, at least one user group ID of the one or more user group IDs in the connection establishment request with a security agent, sending, based on the associating, an authentication request from the BS to the security agent to request the security agent to authenticate the MS, the authentication request including at least the field encrypted based on the key, receiving, by the BS from the security agent, an authentication response indicating that the MS has been authenticated and is permitted to establish a connection to the BS, and sending, by the BS to the MS in response to receiving the authentication response, a connection establishment response indicating that the requested connection to the BS has been established.

According to an example implementation, a method may include sending a BS access key from a base station (BS) to a security agent, wherein the security agent is configured to provide the BS access key to a mobile station (MS), receiving, by the BS, a connection establishment request from the MS that includes one or more fields, at least one of the fields being encrypted using the BS access key, authenticating, by the BS, the MS based on the encrypted field and the BS access key, and sending, by the BS to the MS, a connection establishment response indicating that the requested connection to the BS has been established.

According to another example implementation, an apparatus may include at least one processor and at least one memory including computer instructions, when executed by the at least one processor, cause the apparatus to: send a BS access key from a base station (BS) to a security agent, wherein the security agent is configured to provide the BS access key to a mobile station (MS), receive, by the BS, a connection establishment request from the MS that includes one or more fields, at least one of the fields being encrypted using the BS access key, authenticate, by the BS, the MS based on the encrypted field and the BS access key, and send, by the BS to the MS, a connection establishment response indicating that the requested connection to the BS has been established.

According to another example implementation, a computer program product is provided that includes a non-transitory computer-readable storage medium and storing executable code that, when executed by at least one data processing apparatus, is configured to cause the at least one data processing apparatus to perform a method including: sending a BS access key from a base station (BS) to a security agent, wherein the security agent is configured to provide the BS access key to a mobile station (MS), receiving, by the BS, a connection establishment request from the MS that includes one or more fields, at least one of the fields being encrypted using the BS access key, authenticating, by the BS, the MS based on the encrypted field and the BS access key, and sending, by the BS to the MS, a connection establishment response indicating that the requested connection to the BS has been established.

The details of one or more implementations are set forth in the accompanying drawings and the description below. Other features will be apparent from the description and drawings, and from the claims.

DETAILED DESCRIPTION

Figure 1:
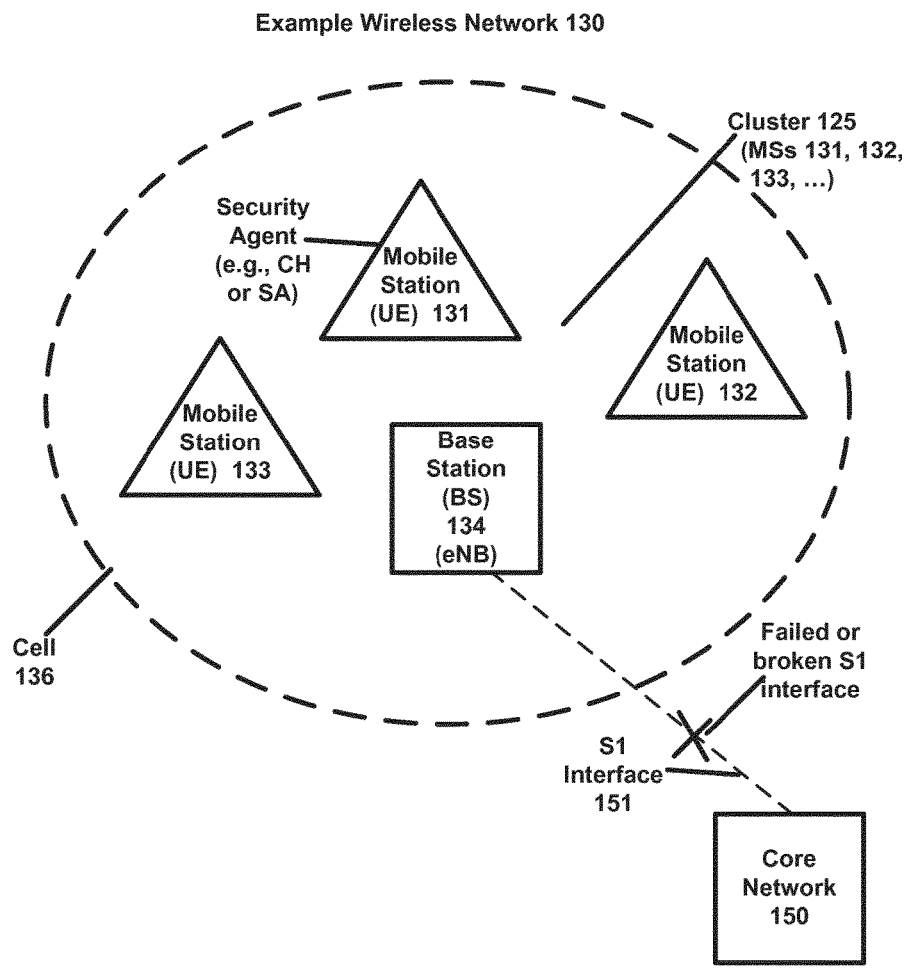
FIG. 1 is a block diagram of a wireless network 130 according to an example implementation.

In some cases, a S1 interface between a base station and core network may fail, such as during a natural disaster, equipment failure, or other condition. In such a situation, according to an example implementation, the mobile stations (MSs) within the cell may switch from a normal or infrastructure mode where signals and data are relayed via the base station (BS) to a device-to-device (D2D) mode in which MSs may directly communicate with each other within the cell. According to an example implementation, at least two options or example implementations are described that relate to a selection and/or configuration of a mobile station (MS) as a security agent (SA). A first option or example implementation describes an example where a MS is pre-configured, or self-configured, to operate as a security agent (SA) in response to a detected S1 (BS-core network interface) failure notification. A second option or example implementation for selection and/or configuration of a MS as a security agent describes an example where a BS receives capability information from one or more MSs and then selects one (or more) MSs to be security agents.

Some types of security functions, such as MS authentication, are typically provided by the core network. However, in the case of a failure of an S1 (BS-core network) interface, such security services or authentication services by the core network may be unavailable to a BS. Therefore, according to an example implementation, the security agent may perform (or at least assist with) security-related services, such as MS authentication.

At least two options or example implementations are described that relate to, after a MS has been configured as a security agent, using the security agent to authenticate (or at least assist in authenticating) a mobile station (MS) to allow the MS to connect to a base station (BS). A first option or example implementation related to MS authentication describes an example where the MS first requests a connection to the BS, and the BS then requests the security agent (SA) to authenticate the MS. A second option or example implementation related to MS authentication describes an example where an MS first obtains a key (or other security context, such as a BS access key) from the SA, and then uses this obtained key or other security context to establish a connection with BS.

According to various example implementations, a MS may be selected and/or configured to operate as a security agent within a wireless network. For example the MS may operate as a security agent, e.g., providing some security services for a wireless device-to-device (D2D) network where MSs may directly communicate with each other. The MS may operate as a security agent for all MSs within a cell, or for only one or more specific user groups of D2D MSs, or for one or more wireless clusters of D2D MSs. In one example implementation, the security agent services may be performed for a wireless cluster by a cluster head (or cluster master). In such case, the security agent may be implemented or provided as part of a cluster head for a cluster. Although, the use of a security agent is not limited to wireless clusters or for cluster heads. Rather, the security agent may be provided for all or some wireless D2D MSs within a cell, regardless whether such MSs are organized into clusters. Therefore, the term security agent refers to a MS that has been selected or configured to provide security-related services, such as MS authentication. Such security agent function or services may be provided by a security agent, or as part of the services that may be provided by a cluster head for a cluster.

FIG. 1 is a block diagram of a wireless network 130 according to an example implementation. In the wireless network 130 of FIG. 1, mobile stations (MSs) 131, 132 and 133, which may also be referred to as user equipments (UEs), may be connected (and in communication) with a base station (BS) 134, which may also be referred to as an enhanced Node B (eNB). BS 134 provides wireless coverage within a cell 136. Although only three MSs are shown within cell 136, any number of MSs may be provided. BS 134 is also connected to a core network 150 via a S1 interface 151 (an example of a BS-core network interface). As described in greater detail below, MS 131 may be configured to operate as a security agent, e.g., in the event of a failure of the S1 interface 151. This is merely one simple example of a wireless network, and others may be used.

Although not required, in another example implementation, MSs 131, 132 and 133 may be part of a wireless cluster 125, and MS 131 may be selected to be the security agent or provide security agent services (e.g., MS authentication) for the cluster 125, e.g., as part of the services provided as a cluster head. Thus, in such an implementation, MS 131 may be a cluster head for the cluster, and may provide security agent services (or operate as a security agent) as part of the cluster head services for the cluster.

In LTE, core network 150 may be referred to as Evolved Packet Core (EPC), which may include a mobility management entity (MME) which may handle or assist with mobility/handover of MSs between BSs, one or more gateways that may forward data and control signals between the BSs and packet data networks or the Internet, and other control functions or blocks. Only a few of the blocks or functions of the example core network are described, and the core network 150 may include different and/or additional blocks/functions, for example.

In some situations, the S1 interface 151 or link (or BS-core network interface or link) may fail or break, which interrupts or prevents transmission of data between the BS and the core network 150. A failed or broken S1 interface may occur due to a variety of circumstances, such as natural disasters (e.g., earthquakes, hurricane or storm), war, failure of power company infrastructure, or other crisis or emergency. These are merely some example situations where a failed S1 interface is likely to occur, but there may be other situations as well. When the S1 interface fails, packets or data from the core network 150 will no longer be received by the BS 134, and BS 134 is unable to send or forward data or other signals to the core network 150.

According to an example implementation, after failure of an S1 interface, it may be desirable to allow MSs of at least one or more selected classes of MSs to continue communicating or operating in a device-to-device (D2D) mode in which MSs may directly communicate with each other. According to one illustrative example implementation, access to the cell may be limited to public safety MSs (e.g., policemen, firemen, doctors, and other emergency or rescue personnel) that are capable of D2D communications, and these MSs may be permitted to continue communicating via a D2D mode of operation. This may allow mission critical communications to continue for PS D2D MSs, even though the S1 (or BS-core network) interface is broken or failed.

Furthermore, even though the S1 interface is failed or broken, the BS may still be capable of operating within the cell by transmitting downlink signals, receiving and processing uplink signals from one or more MSs, etc. Therefore, although not required, in some cases, the BS may continue operating in a D2D assistance mode in which the BS may assist the D2D communications within the cell. However, the core network 150 typically provides some security related services, such as MS authentication and/or authorization, before a MS connects to a BS. However, when the S1 interface has failed or is broken, the core network 150 is unavailable to perform these security related services for MSs and BSs. Therefore, according to example implementations, various techniques are described herein to provide security-related services in the event of a failure or breakage of an S1 interface. According to various example implementations, techniques are described to allow a cluster agent to be selected and/or configured, and then to use the cluster agent to perform or assist with security-related services such as authenticating a MS or allowing a MS to connect to a BS.

According to an example implementation, in the event of a failure of an S1 interface for a cell, one or more MSs within the cell may transition from a normal (cellular or infrastructure mode) of operation that relies on the BS 134 to relay or forward data to and from a connected MS(s), to a D2D (or device-to-device) mode of operation in which direct MS-to-MS communication is performed.

As noted above, a security agent (SA) may provide security related services for wireless D2D MSs within a cell, for one or more user groups of MSs, and/or for one or more wireless clusters, for example. In addition, for a wireless cluster, a cluster head may provide the security agent services as part of the cluster head services. However, security agent is not limited to a wireless cluster.

A cluster head (or master MS within a cluster) may perform a variety of control and coordination functions (including security functions) for the cluster, depending on the implementation. According to one example implementation, a cluster head may transmit reference (or synchronization) signals that may allow other MSs within the cell to become synchronized with each other with respect to the reference signals. The cluster head may also perform security related services, such as authorization and/or authentication of MSs for the cluster. Authorization may include, for example, the cluster head admitting MSs to the cluster, e.g., based on certain criteria such as being a member of a specific access class, a preconfigured user group (e.g., policemen or firemen, or rescue personnel for a specific town), or having a specific capability (e.g., PS MS, D2D MS), or having a certain signal strength or other signal quality, or other admission criteria. For authentication, the cluster head may authenticate each MS that is admitted to the cluster, or authenticate a MS on behalf of a BS, e.g., based one or more encryption keys that have been preconfigured or pre-stored by the MSs and the cluster head, or based on some other security context. A cluster head may also receive resource requests from one or more MSs for D2D communications, may coordinate or allocate resources to one or more D2D MSs within the cluster, and may send a message to one or more MSs within the cluster allocating or assigning resources, such as by broadcasting a resource allocation table. The slave MSs (members of the cluster) within the cluster may then perform D2D communications via their allocated/assigned resources. In this manner, the cluster head may coordinate operation and/or allocate resources so as to reduce the probability of interference or collisions between MSs within the cluster. These are merely some example functions, and a cluster head may perform other functions.

A security agent may perform security-related services. For example, a security agent MS may perform security-related services, such as, for example, authorization and/or authentication functions. For authentication, the cluster head may authenticate each MS, e.g., based one or more encryption keys that have been preconfigured or pre-stored by the MSs (such as based on one or more ciphered/encrypted fields that were ciphered/encrypted by a specific key), a password, or based on some other security context. Thus, according to an example implementation, a security agent may perform a subset of the services (e.g., security-related services) that may typically be performed by a cluster head. In addition, in the event of a failed S1 interface, in some cases, the BS (and/or cluster head or security agent) may limit or restrict access to resources within the cell (or within the cluster, for a cluster agent) to only specific MSs, or specific users, such as D2D MSs (MSs capable of D2D communications), emergency services users/MSs, and/or public safety users/MSs. For example, public safety (PS) users/MSs may include any MS that is assigned to a user that is related to or involved with public safety, such as firemen, policemen, doctors and nurses, rescue teams, and other emergency or crisis personnel, for example. Each MS may store access class membership information, e.g., within a SIM (Subscriber Identity Module) card or a USIM (Universal Subscriber Identity Module) that is stored within the MS, that indicates that the MS is a member of one or more access classes. For example, access class 14 may be for emergency services MSs. Similarly, separate access classes may be provided for: D2D MSs (MSs that are capable of D2D operation), public safety MSs, and/or PS D2D MSs (public safety MSs that are capable of D2D operation). A BS, or a cluster agent after the cluster agent has been configured to be the cluster agent, may transmit barring information or access class barring information, e.g., within a system information block (SIB), such as SIB1 or SIB2, which may be broadcast to MSs within the cell, or by sending other message. The barring information may include, for example, an access barring list that identifies one or more access classes in order to bar or prevent certain access classes from accessing a cell or network (e.g., by preventing the MSs from access resources of such cell or network), and/or to permit or admit other classes to access or use such cell or network resources. Thus, for example, the access barring information may be used to limit access to the cell to only the specified class(es) of MSs, e.g.: D2D MSs (MSs that are capable of D2D operation), public safety (PS) MSs and/or PS D2D MSs, as examples.

Figure 2:
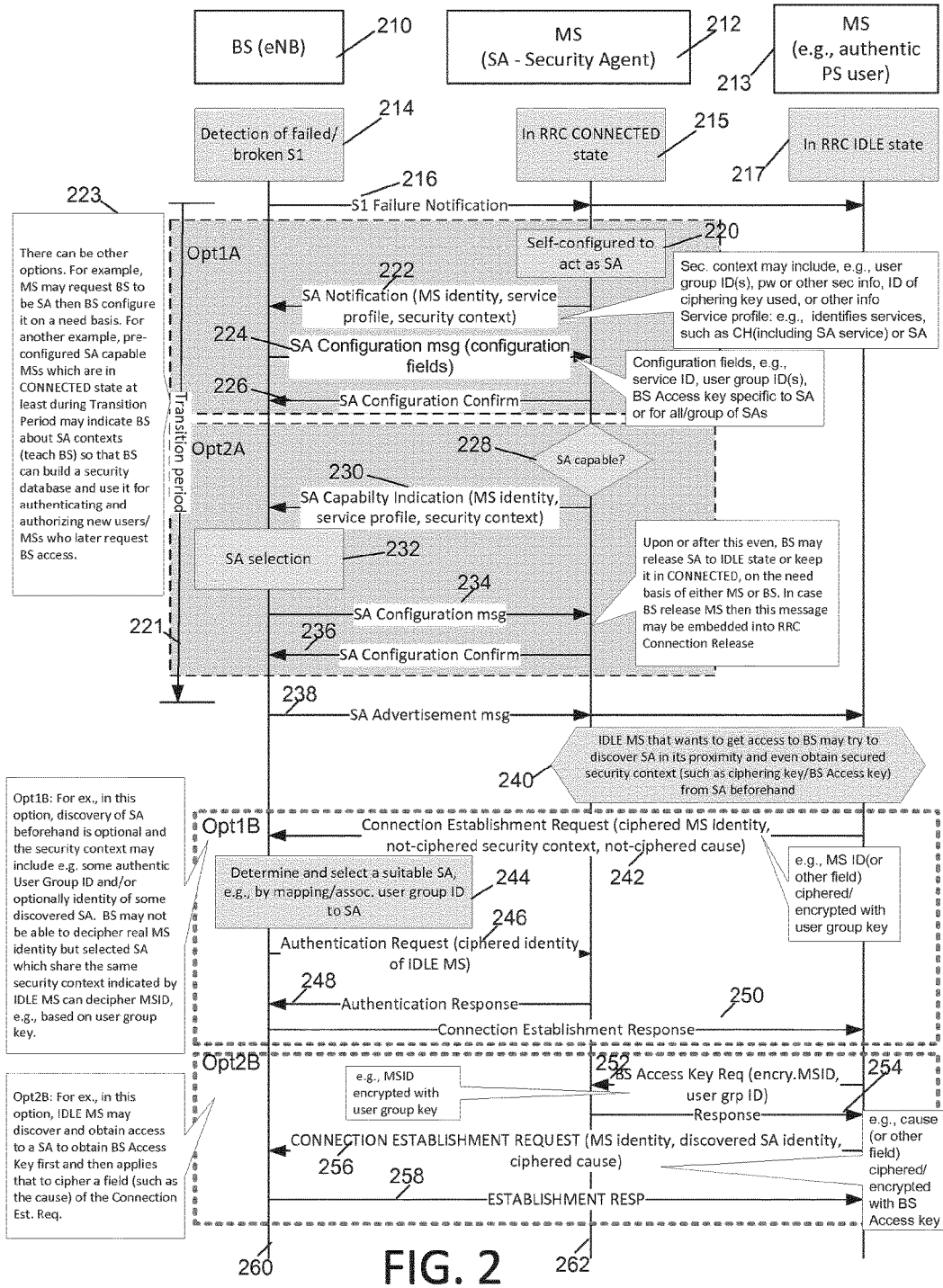
FIG. 2 is a diagram illustrating operation of a wireless network according to an example implementation.

FIG. 2 is a diagram illustrating operation of a wireless network according to an example implementation. As shown by box 215, MS 212 may be connected to BS 210, e.g., MS 212 may be in a Radio Resource Control (RRC) connected state (e.g., connected to BS 210). MS 212 may eventually be configured to operate as a security agent as described in greater detail below. Other MSs may be connected or attached to BS 210. Also, there may be one or more MSs within a cell provided by BS 210 that are not connected to BS 210, or which may be in an idle state (e.g., in an RRC idle state). For example, as shown by box 217, MS 213 may be in a non-connected or RRC-idle state. In an example implementation, MS 212, MS 213 and other MSs may be members of a cluster, although this is not required.

At 214, BS 210 detects a failure of a S1 interface to the core network, which may be more generally referred to as the BS-core network interface. This breakage or failure of the S1 interface 151 (or link or connection) may be detected, for example, by the BS 210 detecting an expiration of a re-transmission timer, or failure of the core network 150 to provide an expected signal or acknowledgement to BS 210 within a certain time period, or other condition indicating the failure of the S1 interface or link between the BS 210 and the core network. Also, MS 212, and/or MS 213 (or other MSs) within the cell, may also be in communication with the core network 150, e.g., to receive handover instructions or other communications. Therefore, a MS, such as MS 212 may similarly detect a non-responsive BS 210, and may report this information to BS 210 as a failed S1 interface. These are merely some examples, and other techniques may be used to detect a failed S1 interface.

As shown in FIG. 2, BS 210 may transmit or send a S1 failure notification message 216 to one or more (or all) of the MSs within the cell, including to MS 212. According to an example implementation, the S1 failure notification message 216 may include one or more fields or parameters, such as, for example: a S1 status field that may indicate a status of the S1 interface as "failed" in this example, a transition period length, a barring information (or access class barring information), and a cell ID for the cell.

The transition period length identifies a length of a transition period 221 after the detection of the failed S1 interface (or sending of the S1 failure notification message) during which the BS 210 may continue operating in a normal (cellular or infrastructure) mode. For example, during the transition period 221, BS 210 may be operated in a normal (cellular or infrastructure) mode, at least (for example) for transmission of common control information to MSs including the BS 210 transmitting the cell's physical cell ID (PCI), system information blocks (SIBs), reference signals, etc. The BS 210 may also communicate with connected MSs to exchange control plane messages during the transition period 221. Also, during the transition period 221, the BS 210 may select and/or configure a MS (or multiple MSs) to be a security agent (or may confirm a pre or self-configuration of a MS as a security agent, as described in greater detail herein. In some cases, the BS 210 may enter a new mode of operation (e.g., either a D2D assistance mode to provide some assistance to the cluster, or a non-operational mode) after expiration of the transition period 221.

A BS (or a cluster head) may limit access to a cell by sending or broadcasting access class barring information. For example, the BS may transmit the access class barring information via broadcasted system information block (e.g., SIB2), or within a S1 failure notification message 216, or within other message(s). Some MSs may be members of one or more high-priority access classes, such as emergency MSs, or other high-priority MSs. Some example high-priority access classes may include: Access class 11—PLMN (public land mobile network); Access class 12—security services; Access class 13—public utilities; Access class 14—emergency services; Access class 15—PLMN (public land mobile network) staff. According to an example implementation, one or more additional high-priority access classes may be provided or assigned to various public safety (PS) MSs and/or D2D MSs, such as: Access class 16—D2D MSs; Access class 17—public safety MSs; Access class 18 for public safety (PS) D2D MSs, etc.

As noted, the BS may broadcast access class barring information to restrict access to the network or cell. According to an example implementation, the access class barring information may include, for example, a barring time which may indicate a time period for which the barring information is valid, and a bit string for high priority access classes (e.g., ac-BarringForSpecialAC). The bit string for high-priority access classes may include a bit for each high-priority access class, e.g., to indicate whether one or more of the high-priority access class (e.g., access classes 11, 12, 13, . . . 18) is barred or not barred from the cell. For example, the bit string for high-priority access classes will indicate a status of "not barred" for an access class to indicate that the associated access class is permitted to access the cell. If at least one bit for an access class of which a MS is a member indicates "not barred", then the MS is not barred, for example. Therefore, in this manner, access class barring information may be used to admit or permit certain access classes of MSs to access a cell, while barring or preventing other access classes from accessing the cell. In an example implementation, in the event of an S1 failure, for example, this access class barring information may be used by a BS to admit or permit only D2D MSs (MSs that are capable of D2D operation), public safety (PS) MSs, or PS D2D MSs (public safety MSs that are D2D capable), or other classes of MSs, to access or use the cell.

The overall architecture of the remainder of FIG. 2 will be summarized. An upper portion of FIG. 2 includes two (alternative) options/implementations, including options 1A and 2A, related to the selection and/or configuration of a MS as a security agent. Option 1A describes an example where a MS 212 is pre-configured, or self-configured, to operate as a security agent in response to a detected S1 failure notification 216. Option 2A describes an example where the BS 210 receives capability information from one or more MSs and then selects one (or more) MSs to be security agents. A lower portion of FIG. 2 includes two alternative options/implementations, including options 1B and 2B, related to authenticating a MS 213 to allow the MS 213 to connect to BS 210. Option 1B describes an example where the MS 213 first requests a connection to BS 210, and the BS then requests the security agent 212 to authenticate the MS 213. Option 2B describes an example where the MS 213 first obtains a key (or other security context) from the security agent 212, and then uses this obtained key or other security context to establish a connection with BS 210. Each of these four options/alternative implementations will be briefly described below.

Option 1A describes an example where a MS 212 is pre-configured, or self-configured, to operate as a security agent, in response to a detected S1 failure notification 216. With reference to FIG. 2, for option 1A, in response to receiving the S1 failure notification 216, at 220, MS 212 self-configures (or has pre-configured) itself to operate as a security agent (SA). In this option, the MS 212 has been pre-configured to operate as a security agent for one or more pre-defined D2D user groups in the event of a S1 failure, e.g., regardless of the existence or operation of a BS 210, for example. Therefore, for example, MS 212 may be pre-configured, or self-configured, to operate as a cluster head for a wireless D2D cluster, or as a security agent. MS 212 may then send a security agent (SA) notification 222 to BS 210 that indicates that the MS 212 has been pre-configured as a SA to perform one or more SA-related services for the wireless D2D cluster.

SA notification 222 may include one or more fields, such as for example, a MS identity for MS 212 (such as a MSID), a service profile that identifies one or more services that the MS has been configured to provide, such as either CH (cluster head services) or SA (security agent services) or some other specific security-related services, and a security context. The security context may include, for example, one or more user group IDs that identify one or more user groups for which the MS/security agent 212 is a member, a password, identification of a ciphering/encryption key or other security information, identification of one or more protocols or security-related features to be used, or other information.

Each MS (or the user associated with or assigned to the MS/cell phone or wireless device) may be a member of one or more user groups. For example, a user group may be a group of MSs (or MSs assigned to or associated with users) that have some common aspect or attribute. For example, example user groups may include, e.g., public safety (PS) users of a specific type (firemen, policemen, rescue services, etc.) and/or within a specific region or area (e.g., public safety users within a specific town), government officials for a particular local, state or federal branch of government, employees or officers or managers of a specific company or firm, members of a family, or other user group. A different user group ID may be assigned to each user group, and a MS (or user) may be a member of one or more user groups. For example, a person (and his/her associated MS or mobile phone/device) may be a member of the following user groups (this is merely one example): 1) a member of his family user group, 2) as an employee of a company or firm he would be a member of the user group for his company/firm, and/or 3) as a volunteer firemen for his local volunteer fire department he would be a member of the volunteer fire department user group. These are merely examples, and other user groups or examples may be used.

In response to the SA notification 222, the BS 210 sends to SA/MS 212 a SA (security agent) configuration message 224 to configure (or confirm configuration) of MS 212 as a security agent. The SA configuration message 224 may include one or more configuration fields, such as a service ID that identifies one or more of the services listed in the service profile in SA notification 222. The service ID may identify the SA service(s) (e.g., CH or SA or other service) for which the MS 212 has been configured to perform/provide to the cluster. The CA configuration message 224 may also include one or more user group IDs to identify the user group for which the MS 212 has been configured to provide the service identified by the service ID(s). In some cases, different SAs may be configured or assigned to perform SA services (or security-related services) for different user groups, for example. SA configuration message 224 may also include a BS access key that may be assigned to the BS (or multiple BSs) and may be used by one or more MSs to be authenticated for access to the BS 210 and/or to be used to allow a MS to connect to the BS 210, for example. The BS access key may be for all SAs, or may be specific to SA 212. The BS access key may be for a specific user group (e.g., to allow only users/MSs of specific user group to be authenticated or obtain access to BS 210), or may be used by MSs for all user groups to be authenticated or obtain access to BS 210. Also, according to another example implementation, MS 212 may operate as a security agent, even in the event that BS 210 does not reply to MS 212 with a SA configuration message 224 or other communication.

In response to the SA configuration message 224, the MS/SA 212 may then send BS 210 a SA configuration confirm message 226 that confirms that the MS 212 will provide/perform the identified service(s) as a security agent (SA), e.g., for the one or more identified user groups, for example.

As shown in FIG. 2, Option 2A describes an example where the BS 210 receives capability information from one or more MSs and then selects one (or more) MSs to be security agents for one or more user groups. At 228, in response to receiving the S1 failure notification 216, MS 212 may determine what services it is capable of providing, e.g., determines whether the MS 212 can operate as a cluster head and/or security agent, or provide other service. For example, the service capability information (identifying which cluster services the MS is capable of providing) may be stored in memory within each MS, for example.

Next, MS 212 may then transmit a security agent (SA) capability indication 230 that indicates that the MS 212 is capable of performing one or more services. BS 210 may receive a SA capability indication 230 from one or more MSs. The SA capability indication 230 may include one or more fields in a same or similar manner as the SA notification 222. Thus, the SA capability indication 230 may include a MSID that identifies MS 212, a service profile that identifies one or more services that MS 212 is capable of providing (e.g., CH and/or SA services, or other services), and a security context. The security context may include, for example, one or more user group IDs that identify one or more user groups for which the MS 212 is a member, a password, identification of a ciphering/encryption key or other security information, identification of one or more protocols or security-related features to be used, or other information.

According to an example implementation, the SA capability indication 230 may also identify resources to be used by the MS to transmit reference (or synchronization) signals, e.g., in the event that the MS is selected to be a cluster head. Alternatively, the BS 210 may specify, e.g., in a reply message, or in a SA configuration message 234, the resources that should be used by the cluster head to transmit reference signals.

At 232, based on the one or more received SA capability indications 230, BS 210 may select one or more of the MSs to be a security agent and perform one or more services. Thus, at 232, BS 210 may select MS 212 (or other MS) to be a security agent. For example, cluster heads/security agents may be selected that are spatially distributed so as to allow multiple clusters to cover a larger geographical area (e.g., higher percentage of cell area), as compared to just one cluster. A variety of factors may be used to select one or more of the CH or SA capable MSs to be a cluster head or security agent, such as signal strength, or other criteria.

A MS may indicate its capabilities, e.g., capabilities to be a cluster head or security agent or provide other service, in a SA capability indication 230, as described above. Alternatively, the BS 210 may obtain SA capability information from a MS during connection establishment by each MS where capability information may be provided to the BS 210 by one or more (or each) MS during such connection establishment process. Therefore, according to this example implementation, capability indications 230 may be omitted, and the BS 210 may select a MS to be a security agent among active or connected BSs that previously indicated a D2D capability security agent capability, e.g., via the capability exchange that may be performed as part of the connection establishment process. In another example implementation at 232, BS 210 may select one or more MSs to be a cluster agent, e.g., cluster head or security agent, based on the cluster agent capability indication(s) 230 sent to BS 210, e.g., select one or more of the MSs that indicated they are security agent capable based on message(s) 230.

As noted, a MS may be selected that indicates it is capable of providing the service (e.g., SA). In addition to capability information, security agents may be selected based on other criteria or information, such as, for example: 1) MS battery condition, 2) MS location within the cell, and 3) MS user group information. For example, with respect to criteria 1), a MS battery with a higher charge may be more desirable as a security agent than a MS with lower battery charge, since operating as a security agent may drain a MS battery more quickly than normal MS operation. With respect to criteria 2), a MS location for a MS that is more stable within the cell may be selected to be a security agent, e.g., since such a MS may be expected to remain at a same or similar location for a longer period of time. Also, a MS located at a central location within the cell that is selected as security agent may be more desirable to cover a larger portion of the cell. Or if multiple clusters are provided, then location of MS may be a factor in security agent selection since it may be desirable to provide one security agent to cover multiple clusters, or to provide spatially-diverse or geographically-diverse MSs to provide a CH or SA for each of multiple clusters that cover a larger area. Location of a MS may be determined or estimated based on, e.g., received signal strength of signals from MS (or received signal strength of signals received by MS from BS, and reported to BS), uplink timing advance information, user location information (e.g., GPS location or other reported location of MS).

With respect to criteria 3), each MS may be a member of one or more user groups. User group information/membership may be a criteria in security agent selection. For example, a MS may be selected for security agent that is a member of the highest number of user groups, or a member of a specific user group that may be important or may be mission critical or high priority (e.g., public safety, police, firemen, or rescue user groups, etc.) or at least a threshold priority level, where each user group may be assigned a priority level. Thus, a MS may be selected as a security agent if the MS is a member of a specific user group(s). For example, BS 210 may select a MS to be SA that is a member of at least one public safety user group, such as a police user group, firemen user group, rescue services user group, government user group, etc.

BS 210 may then transmit or send a security agent (SA) configuration message 234 to each of the one or more MSs that were selected to be a security agent to indicate that the MS has been selected to be a security agent. The security agent (SA) configuration message 234 may include one or more fields, similar to SA configuration message 224. The security agent (SA) configuration message 234 may include one or more configuration fields, such as a service ID that identifies one or more of the services listed in the service profile in SA capability indication 230. The service ID may identify services, such as CH or SA or other service for which the MS 212 has been selected by BS 210 to perform/provide. The SA configuration message 234 may also include one or more user group IDs to identify the user group for which the MS 212 has been selected to provide the service identified by the service ID(s). Different CAs may be configured or assigned to perform SA services (or to be an SA) for different user groups, for example. SA configuration message 234 may also include a BS access key that may be assigned to the BS (or multiple BSs) and may be used by one or more MSs to be authenticated for access to the BS 210 and/or to be used to allow the MS to connect to the BS 210, for example.

In response to the SA configuration message 234, the MS/CA 212 may then send BS 210 a SA configuration confirm message 236 (similar to message 226) that confirms that the MS 212 will provide/perform the identified service(s) as a security agent (SA), e.g., for the one or more identified user groups, for example.

After completing either option 1A or 2A, the BS 210 may also send or broadcast a SA advertisement message 238 to one or more (or all) of the MSs within the cell. The SA advertisement message 238 may identify the cell resources to be used for transmission of reference signals, e.g., from the security agent or cluster head. The SA advertisement message 238 may include additional information, such as an MS identifier for the security agent, such as a MSID, a cluster ID to identify the cluster (in the case where a cluster is involved), one or more service IDs to identify a service provided by the security agent (e.g., identifying CH or SA services, or other service, for example), and one or more user group IDs to identify one or more user groups for which the security agent is providing service. According to an example implementation, one purpose of the broadcasted SA advertisement message 238 is to identify the resources for reference signals to allow other MSs and/or other members of the user group to synchronize to the security agent (or cluster head providing SA services), and thereby decrease interference or collisions between MSs. Other information may be broadcasted or advertised by the BS 210, including any information that may assist MSs (e.g., public safety D2D MSs) to discover the SA and each other more quickly, and to allow the MSs to perform D2D communications in a more secure and efficient way, such as identities of MSs, reference sequences, service profiles of MSs, and/or any limitation/restriction of the security agents. The SA advertisement message 238, or all or part of the information of such message, may be broadcast periodically, e.g., every frame, or a multiple of every frame period. For example, if a frame period is 10 ms, then the SA advertisement message 238 may be re-broadcast every 60 ms, 70 ms, or 80 ms, etc.

A variety of different messages may be used to send or broadcast the SA advertisement message 238. In a first example implementation, the SA advertisement message 238 may be broadcast via a system information block (SIB) broadcasted by the BS 210. In a second example implementation, the MSs within a cell or cluster may be notified of a broadcast group address. A transmission is then scheduled on the broadcast group address, and the SA advertisement message 238 may be broadcasted via the scheduled transmission. In yet another example implementation, the SA advertisement message 238 may be sent as a radio resource control (RRC) connection release message, e.g., with cause indicated as D2D, or cluster, or S1 interface failure, etc. This connection release message may cause the MS to release its connection and then transition to a D2D mode of operation for D2D communication within the cluster.

According to an alternative example implementation, security agent configuration messages 224, 234 may be omitted, and each selected security agent may be notified that it was selected as security agent within the SA advertisement message 238. Thus, in such an example embodiment, the SA advertisement message 238 may include at least the MSID of each MS selected for security agent and, e.g., may identify the resources to be used for transmission of reference signals, and possibly one or more of the other fields provided in the security agent configuration messages 224, 234.

After SA configuration messages 224, 234, the MSs selected or configured as security agents begin operating as security agents for one or more user groups, for example. Also, at or after, for example, the SA configuration messages 224, 234, the BS 210 may release the MS 212 (e.g., SA) to an idle (e.g., RRC idle) state, or may keep it in a connected (e.g., RRC connected) state. For example, if the BS 210 will release the selected/configured MS 212, then the SA configuration message 224, 234 may be provided within a RRC connection release message.

In addition to the SA advertisement message 238, which may be transmitted and the re-broadcast periodically by BS 210, CA 212 may also broadcast a beacon (or other broadcast information), e.g., at periodic intervals. This beacon or broadcast information may include, for example, a MSID of the security agent (SA) 212, a service profile for the SA 212 that identifies the service(s) provided by the SA 212 (e.g., CH or SA services, or other services), an indication of a channel on which a MS may submit a request for a BS access key (resources/channel where MS can submit a BS access key request to SA 212), and a security context for the CA 212 that includes at least one or more user group IDs for which the SA 212 is a member and provides the identified services, channel structure information or resource information for accessing the SA 212, and other information.

Other than options 1A or 2A, there may be other options or example implementations. For example, the MS 212 may send a request to BS 212 to be a SA, and then the BS 210 may then select or configure the MS 212 to be the SA, e.g. for one or more user group(s) as needed.

In another example implementation, pre-configured SA capable MSs that are connected to BS 210 (in a RRC connected state) at least within transition period 221 may provide BS 210 with security contexts (e.g., access keys, passwords or other security context information) so that the BS 210 can create or build a security database. The BS 210 may then directly authorize and/or authenticate new users or MSs (e.g., MSs in an idle state) that request a connection (or access) to BS 210 based on the security database.

After receiving a SA configuration message 224, 234, or even without receiving such message, the selected/configured MS 212 may begin operating as a security agent to provide the specified service for one or more user groups. At 240, other MSs may discover one or more security agents, e.g., by identifying the resources for security agent reference signals from BS 210 for one or more security agents, and then the idle MS 213 synchronizing to the security agent based on the reference signals transmitted by the SA/MS 212. MSs may also discover security agents (SAs) and their associated services, user group IDs, resources, etc., based on the beacon broadcasted by each of one or more CAs. Also, the idle MS 213 may request a connection to a BS 210. However, according to one example implementation, the idle MS 213 may request a BS access key from the SA prior to requesting a connection to BS 210.

The options 1B and 2B will now be briefly described. After a MS (e.g., MS 212) has been selected and/or configured to operate as a security agent (SA), the SA 212 may, for example, authenticate one or more MSs prior to such MSs being connected to BS 210. Two example implementations for MS authentication are shown in FIG. 2 as options 1B and 2B. Option 1B describes an example where the MS 213 first requests a connection to BS 210, and the BS then requests the security agent 212 to authenticate the MS 213. Option 2B describes an example where the MS 213 first obtains a key (or other security context) from the security agent 212, and then uses this obtained key or other security context to establish a connection with BS 210.

Referring to option 1B in FIG. 2, MS 212 is configured and operating as a security agent. MS 213 sends a connection establishment request 242 to BS 210. The connection establishment request 242 includes one or more fields, such as, for example, a MSID that identifies MS 213, a security context and a cause. The cause identifies a cause or reason for connecting to the BS 210, or a service request. For example, the cause may indicate request for a D2D connection to another MS, a request for a resource for BS to broadcast or multicast information (e.g., public safety or emergency information regarding an emergency to be broadcast to all MSs that are members of one or more user groups, such as to all policeman or firemen for a specific town or city), or other service or reason for establishing a connection to BS 210. The security context may include, for example, one or more user group IDs that identify one or more user groups for which the MS 213 is a member, a password, or some encrypted information such as one of the fields being encrypted. According to an example implementation, at least the MSID is encrypted/ciphered using a user group key (or other key) that was previously provided to or stored on MS 213, e.g., to allow the MS 213 to be authenticated. The other fields are not (necessarily) encrypted/ciphered, according to an example implementation. The user group key may be available to MS 213 (and other MSs within the user group) and MS/SA 212 since both MS 213 and MS 212 are members of the user group corresponding to the user group key that is used to cipher or encrypt the MSID. For example, each member of a user group may be preconfigured with the user group key, or may obtain such user group key prior to the MS joining or becoming a member of the user group. The BS 210 may not have the user group key, according to one example implementation. Alternatively, another field(s) such as the user group ID, may be encrypted with the user group key, for example.

At 244, BS 210 determines/identifies a security agent (SA) corresponding to or associated with the user group ID provided in the connection establishment request 242. For example, the BS 210 may map or associate at least one user group ID from the connection establishment request 242 to a security agent assigned to that user group ID. In this example, the user group ID is mapped to or associated with the security agent 212, e.g., based on a lookup table stored at BS 210, or by other technique. The MSID for MS 213 is encrypted using a key, such as a user group key (corresponding to a user group for which the MS 213 is a member), which may not be available to BS 210. Therefore, in an alternative implementation, the BS 210 may determine a security agent (SA) based on the MSID in the event that only the user group ID is encrypted, for example.

Next, BS 210 sends an authentication request 246 to the identified security agent (SA) 212 (the SA associated with the user group key in the connection establishment request 242). The authentication request 246 may include one or more fields, such as the encrypted/ciphered MSID of MS 213. In an example implementation, the BS 210 does not (necessarily) decrypt/decipher the encrypted MSID, since BS 210 does not necessarily have the user group key. Rather, BS 210 may simply receive the encrypted MSID that was encrypted/ciphered using the user group key, and forwards the encrypted MSID (e.g., without decrypting the MSID) in the authentication request 246, for example.

SA 212 may then authenticate the MS 213 based on the encrypted MSID (or other encrypted field) for MS 213 and the user group key, for example. For example, the SA 212 may decrypt/decipher the MSID using the user group key. Decrypting the encrypted MSID to obtain a MSID or an MSID that has a valid format may be sufficient to authenticate the MS 213. Alternatively, the SA 212 may then compare the MSID to a list of MSIDs that are members of one or more user groups, to confirm that the MSID is a member of one of these user groups (e.g., user group corresponding to the user group ID that is provided by the MS 213), in order to authenticate the MS 213 or validate MS 213 as an authentic member of the identified user group. SA 212 may then send an authentication response 248 indicating whether or not the MSID for MS 213 has been authenticated. In one example implementation, an authentication response 248 (which includes the MSID for MS 213) is sent to BS 210 only if MS 213 is authenticated by SA 212. BS 210 may then establish the requested connection to MS 213 and then send a connection establishment response 250 to the MS 213 indicating that the requested connection to BS 210 has been established.

With respect to option 1B, the discovery of the security agent (SA) prior to performing operations of option 1B is optional and the security context included in request 242 may include a user group ID and/or optionally the identity of some discovered SA, such as the MSID of SA 212, to which the authentication request 246 should be sent. The BS 210 may not be able to decipher/decrypt the encrypted/ciphered MSID of MS 213. However, the SAs (such as SA 212) that are members of the user group (the user group identified by the user group ID) and, thus, share the same user group key as the requesting idle MS 213, can decipher or decrypt the encrypted MSID based on the user group key.

Referring to option 2B in FIG. 2, SA 212 receives a BS access key request 252 that requests the BS access key for BS 210. The BS access key request 252 may be submitted via a channel or resources that may have been identified based on the beacon or other broadcast information that was broadcast by the SA 212, for example. The BS access key request 252 may include, for example, at least one field that is encrypted using the user group key. For example, the BS access key request 252 may include, for example, an unencrypted user group ID, and an encrypted MSID that was encrypted/ciphered with the user group key (corresponding to the identified user group ID) for a user group for which both MS 213 and SA/MS 212 are both members, and thus, both MS 213 and SA 213 have this shared user group key, for example.

The SA 213 may then authenticate the MS 213 based on the encrypted field (e.g., encrypted MSID) and the user group key, or using another technique. For example, the SA 212 may decrypt/decipher the encrypted MSID using the shared user group key, or other technique. As noted above, the BS access key (for BS 210) may have been previously provided by BS 210 to SA 212, e.g., via the security context within SA configuration message(s) 224, 234, or other message. SA 212 may then send a BS access key response 254, including the BS access key to MS 213.

MS 213 then sends a connection establishment request 256 to BS 210, including one or more fields, such as a MSID for MS 213, the discovered SA identity (e.g., MSID of SA 212), and a cause or reason for the connection request. The cause may indicate a request for a D2D connection to another MS, or a request for resources for BS to broadcast or multicast a message to MSs, or other reason or cause. One or more of the fields, such as the cause, included in the connection establishment request 256 may be encrypted using the BS access key. Other fields may alternatively be encrypted or ciphered using the BS access key, for example. BS 210 may then authenticate MS 213 based on the encrypted field (e.g., encrypted cause) and the BS access key, e.g., by deciphering or decrypting the encrypted cause using the BS access key, or using other technique.

After authenticating MS 213, the BS 210 may establish the connection with MS 213 and send an establishment response 258 to MS 213 indicating that the requested connection between BS 210 and MS 213 has been established. Thus, according to an example implementation (e.g., option 2B), the idle MS 213 may discover SA 212 (and resources or a channel to submit a BS access key request 252), and then obtain a BS access key for BS 210 from the SA 212 (via messages 252, 254), and then MS 213 applies such BS access key to encrypt one or more fields that are submitted to BS 210 as part of a connection establishment request 256.

At 260, in case the SA/MS 212 is released to idle state by BS 210, the BS 201 may have to page SA 212 to authenticate MS 213 in option 1B above. Also, SA in an idle state (e.g., RRC idle state) may use a configured BS access key to communicate with or obtain access to BS 210 anytime, since BS 210 may store security contexts of all configured SAs (either idle or connected CAs) after the transition period 221.

Throughout the various embodiments described herein, different types of encryption/ciphering keys may be used, such as either a symmetric algorithm in which a single key is used for both encryption and decryption. For example, the BS access key and/or the user group key may each be a single key (symmetric algorithm where one key is used for both encryption and decryption). Alternatively, one or more of the various embodiments or messages herein may use asymmetric algorithms that use pairs of keys. In such an example implementation, one key is typically used for encryption and the other one for decryption, and one of the keys is kept private. For example, the BS access key and the user group key may include a public key/private key pair, where the private key of such key pair may be stored privately by the SA (for the user group key) or by the BS 210 (for BS access key), for example, and the public key for the key pair may be stored in advance by the MS or may be obtained by the MS via the handshaking or key requests (e.g., BS access key request) described herein. For example, a public key of the BS access key pair may be obtained by the SA 212 via the SA configuration message 224 or 234. And, the MS 213 may obtain the public key of the BS access key pair from the SA 212 via the BS access key request and response messages 252, 254. This is merely another example implementation, and other implementations may be used.

Figure 3:
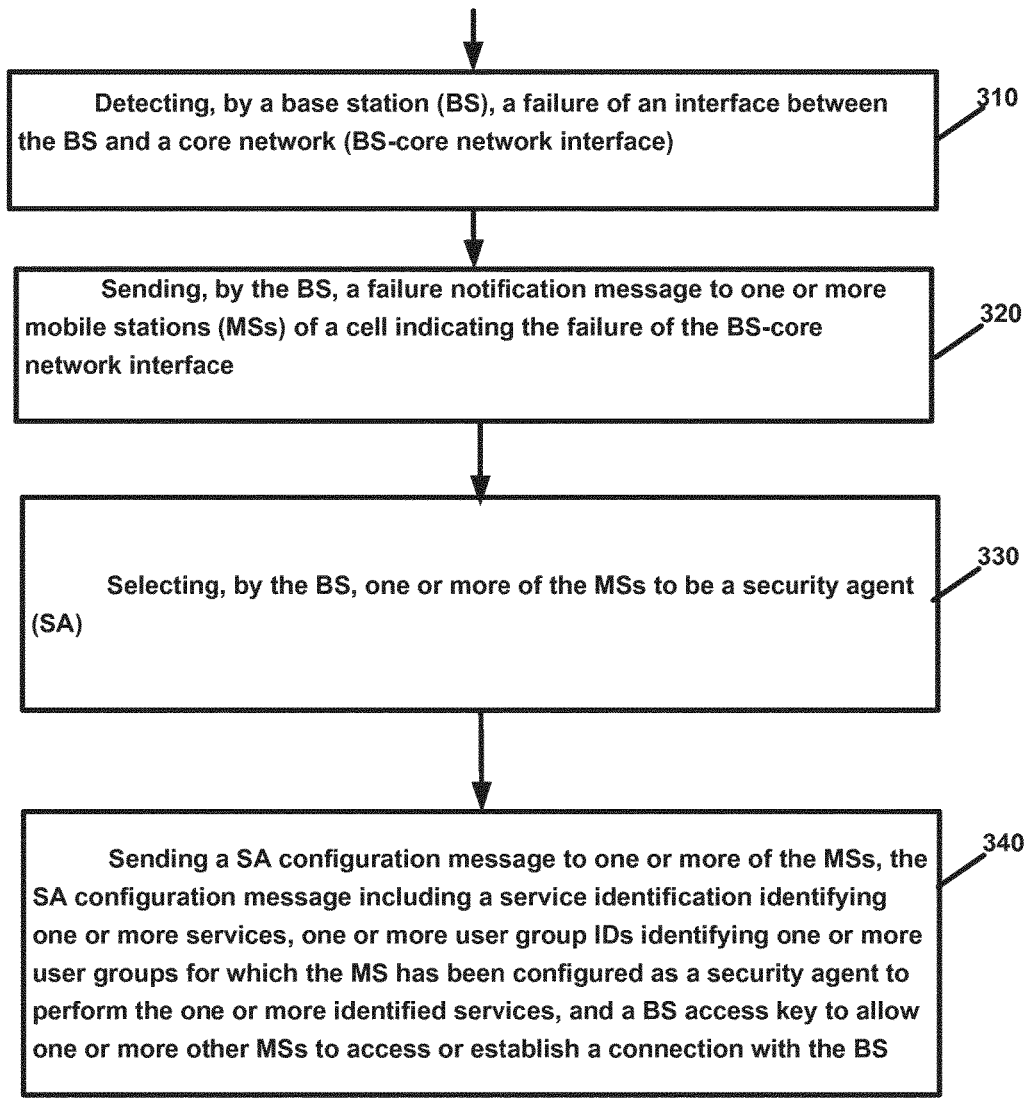
FIG. 3 is a flow chart illustrating operation of a base station (BS) according to an example implementation.

FIG. 3 is a flow chart illustrating operation of a base station (BS) according to an example implementation. At 310, a base station may detect a failure of an interface between the BS and a core network (BS-core network interface). At 320, the BS sends a failure notification message to one or more mobile stations (MSs) of a cell indicating the failure of the BS-core network interface. At 330, the BS selects one or more of the MSs to be a security agent (SA). At 340 the BS sends a SA configuration message to one or more of the MSs, the SA configuration message including a service identification identifying one or more services, one or more user group IDs identifying one or more user groups for which the MS has been configured as a security agent to perform the one or more identified services, and a BS access key to allow one or more other MSs to access or establish a connection with the BS.

According to an example implementation, the method of FIG. 3 may further include receiving, by the BS, a security agent (SA) notification from one or more of the MSs, the SA notification including at least a service profile identifying one or more services that the MS can perform for one or more device-to-device (D2D) MSs, and one or more user group IDs that identify one or more user groups of which the MS is a member.

According to an example implementation, in the method of FIG. 3, the security agent (SA) notification may include a capability indication that indicates that the MS is capable of performing the one or more services identified by the service profile.

According to an example implementation, in the method of FIG. 3, the security agent (SA) notification may include a SA notification that indicates that the MS has been preconfigured to perform the one or more services identified by the service profile.

According to an example implementation, in the method of FIG. 3, the service identification included in the SA configuration message identifies that the MS has been configured as a cluster head for one or more identified user groups.

According to an example implementation, in the method of FIG. 3, the service identification included in the SA configuration message identifies that the MS has been configured as a security agent for one or more identified user groups.

According to an example implementation, in the method of FIG. 3, the service profile identifying one or more services that the MS can perform for one or more device-to-device (D2D) MSs identifies one or more of a cluster head service and a security agent service, wherein the cluster head service is provided for a D2D cluster, and the security agent service is provided for one or more D2D MSs.

According to an example implementation, the method of FIG. 3 may further include receiving at the BS from one or more of the MSs a SA configuration confirm message confirming the configuration of the MS as a security agent to perform at least one of the services for one or more user groups.

According to an example implementation, the method of FIG. 3 may further include the BS broadcasting a SA advertisement message to one or more MSs, the SA advertisement message identifying at least cell resources to be used by the selected security agent to transmit reference and/or beacon signals for synchronization and proximity discovery.

According to an example implementation, the method of FIG. 3 may further include the BS broadcasting a SA advertisement message to one or more MSs, the SA advertisement message identifying at least cell resources to be used by the selected security agent to transmit reference and/or beacon signals for synchronization and proximity discovery and one or more user group IDs that identify user groups associated with the reference signal resources.

According to an example implementation, in the method of FIG. 3, the MS includes a first MS, the method further including: receiving, by the BS, a connection establishment request from a second MS that includes one or more fields, at least one of the fields being encrypted using the BS access key, authenticating the second MS based on the encrypted field and the BS access key, and sending, by the BS to the second MS, a connection establishment response indicating that the requested connection to the BS has been established.

According to an example implementation, in the method of FIG. 3, the MS includes a first MS, the method further including: receiving, by the BS, a connection establishment request from a second MS that includes a plurality of fields including at least a MSID and a user group for which the second MS is a member, at least one of the fields being encrypted using a user group key associated with the user group for which the second MS is a member, associating the user group in the connection establishment request with the first MS, sending, based on the associating, an authentication request from the BS to the first MS, the authentication request including at least the field encrypted based on the user group key, receiving, by the BS from the first MS, an authentication response indicating that the second MS is authenticated and permitted to establish a connection to the BS, the first MS authenticating, and sending, by the BS to the second MS, a connection establishment response indicating that the requested connection to the BS has been established based on the authentication response.

According to another example implementation, an apparatus may include at least one processor and at least one memory including computer instructions, when executed by the at least one processor, cause the apparatus to: detect, by a base station (BS), a failure of an interface between the BS and a core network (BS-core network interface), send, by the BS, a failure notification message to one or more mobile stations (MSs) of a cell indicating the failure of the BS-core network interface, selecting, by the BS, one of the MSs to be a security agent (SA), and send a SA configuration message to one or more of the MSs, the SA configuration message including a service identification identifying at least one of the one or more services, one or more user group IDs identifying one or more user groups for which the MS has been configured as a security agent to perform the identified service, and a BS access key to allow one or more other MSs to access or establish a connection with the BS.

According to another example implementation, a computer program product is provided that includes a non-transitory computer-readable storage medium and storing executable code that, when executed by at least one data processing apparatus, is configured to cause the at least one data processing apparatus to perform a method including: detecting, by a base station (BS), a failure of an interface between the BS and a core network (BS-core network interface), sending, by the BS, a failure notification message to one or more mobile stations (MSs) of a cell indicating the failure of the BS-core network interface, selecting, by the BS, one of the MSs to be a security agent (SA), and sending a SA configuration message to one or more of the MSs, the SA configuration message including a service identification identifying at least one of the one or more services, one or more user group IDs identifying one or more user groups for which the MS has been configured as a security agent to perform the identified service, and a BS access key to allow one or more other MSs to access or establish a connection with the BS.]

Figure 4:
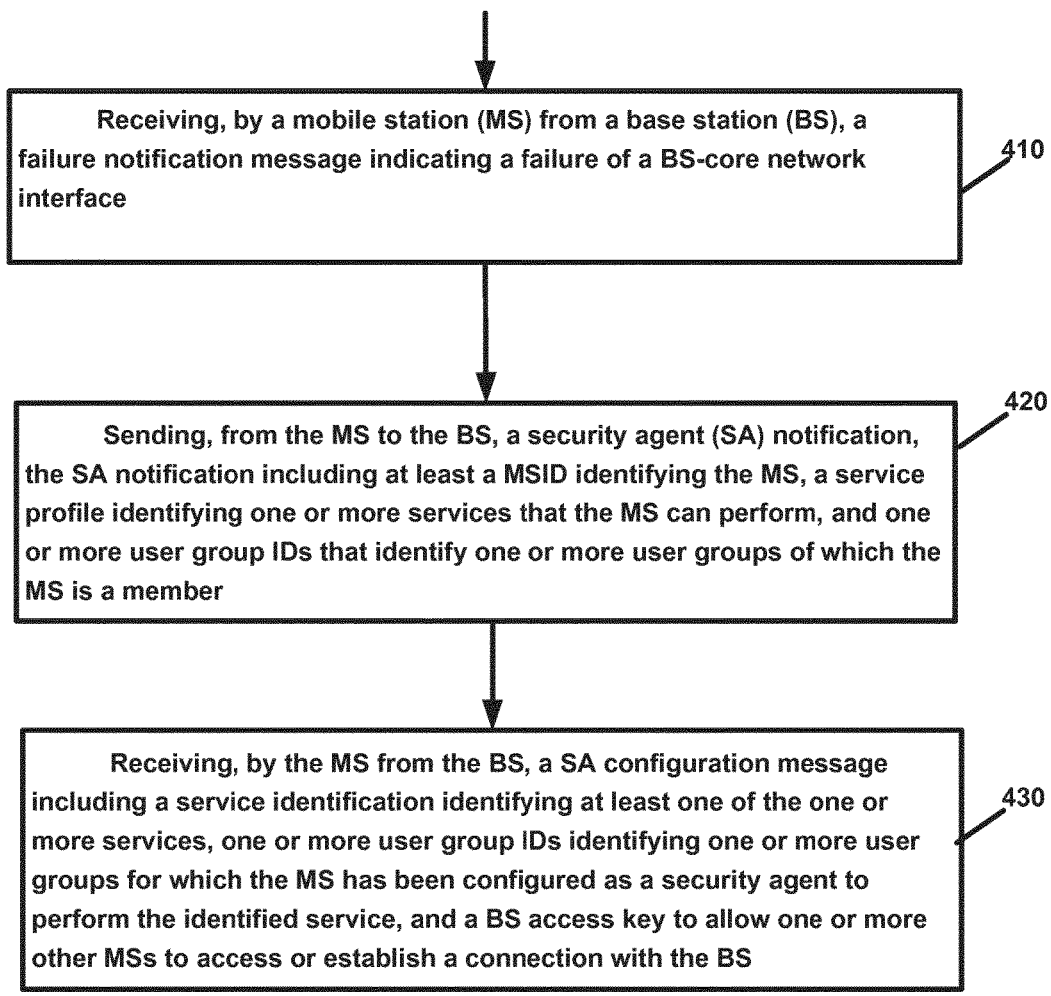
FIG. 4 is a flow chart illustrating operation of a mobile station (MS) according to an example implementation.

FIG. 4 is a flow chart illustrating operation of a mobile station (MS) according to an example implementation. At 410, a mobile station (MS) may receive from a base station (BS) a failure notification message indicating a failure of a BS-core network interface. At 420 the MS may sending to the BS a security agent (SA) notification, the SA notification including at least a MSID identifying the MS, a service profile identifying one or more services that the MS can perform, and one or more user group IDs that identify one or more user groups of which the MS is a member. At 430, the MS may receive from the BS a SA configuration message including a service identification identifying at least one of the one or more services, one or more user group IDs identifying one or more user groups for which the MS has been configured as a security agent to perform the identified service, and a BS access key to allow one or more other MSs to access or establish a connection with the BS.

According to an example implementation, in the method of FIG. 4, the security agent (SA) notification includes a capability indication that indicates that the MS is capable of performing the one or more services identified by the service profile.

According to an example implementation, the method of FIG. 4 may further include reconfiguring, by the MS, the MS from a cellular or infrastructure mode to operate as a security agent to perform the one or more services identified by the service profile in a D2D wireless mode, wherein the security agent (SA) notification comprises a SA notification that indicates that the MS has been preconfigured to perform the one or more services identified by the service profile.

According to an example implementation, in the method of FIG. 4, the MS includes a first MS, the method further including: receiving, by the first MS, a BS access key request from a second MS, the BS access key request including a plurality of fields including at least a MSID and one or more user group IDs for user groups for which the second MS is a member, at least one of the fields being encrypted based upon a user group key, authenticating, by the first MS, the second MS based on at least the encrypted field, and sending, from the first MS to the second MS based on the authenticating, an access key response to the second MS including the BS access key to allow the second MS to establish a connection to the BS based on the BS access key.

According to another example implementation, an apparatus may include at least one processor and at least one memory including computer instructions, when executed by the at least one processor, cause the apparatus to: receive, by a mobile station (MS) from a base station (BS), a failure notification message indicating a failure of a BS-core network interface, send, from the MS to the BS, a security agent (SA) notification, the SA notification including at least a MSID identifying the MS, a service profile identifying one or more services that the MS can perform, and one or more user group IDs that identify one or more user groups of which the MS is a member, and receive, by the MS from the BS, a SA configuration message including a service identification identifying at least one of the one or more services, one or more user group IDs identifying one or more user groups for which the MS has been configured as a security agent to perform the identified service, and a BS access key to allow one or more other MSs to access or establish a connection with the BS.

According to another example implementation, a computer program product is provided that includes a non-transitory computer-readable storage medium and storing executable code that, when executed by at least one data processing apparatus, is configured to cause the at least one data processing apparatus to perform a method including: receiving, by a mobile station (MS) from a base station (BS), a failure notification message indicating a failure of a BS-core network interface, sending, from the MS to the BS, a security agent (SA) notification, the SA notification including at least a MSID identifying the MS, a service profile identifying one or more services that the MS can perform, and one or more user group IDs that identify one or more user groups of which the MS is a member, and receiving, by the MS from the BS, a SA configuration message including a service identification identifying at least one of the one or more services, one or more user group IDs identifying one or more user groups for which the MS has been configured as a security agent to perform the identified service, and a BS access key to allow one or more other MSs to access or establish a connection with the BS.

Figure 5:
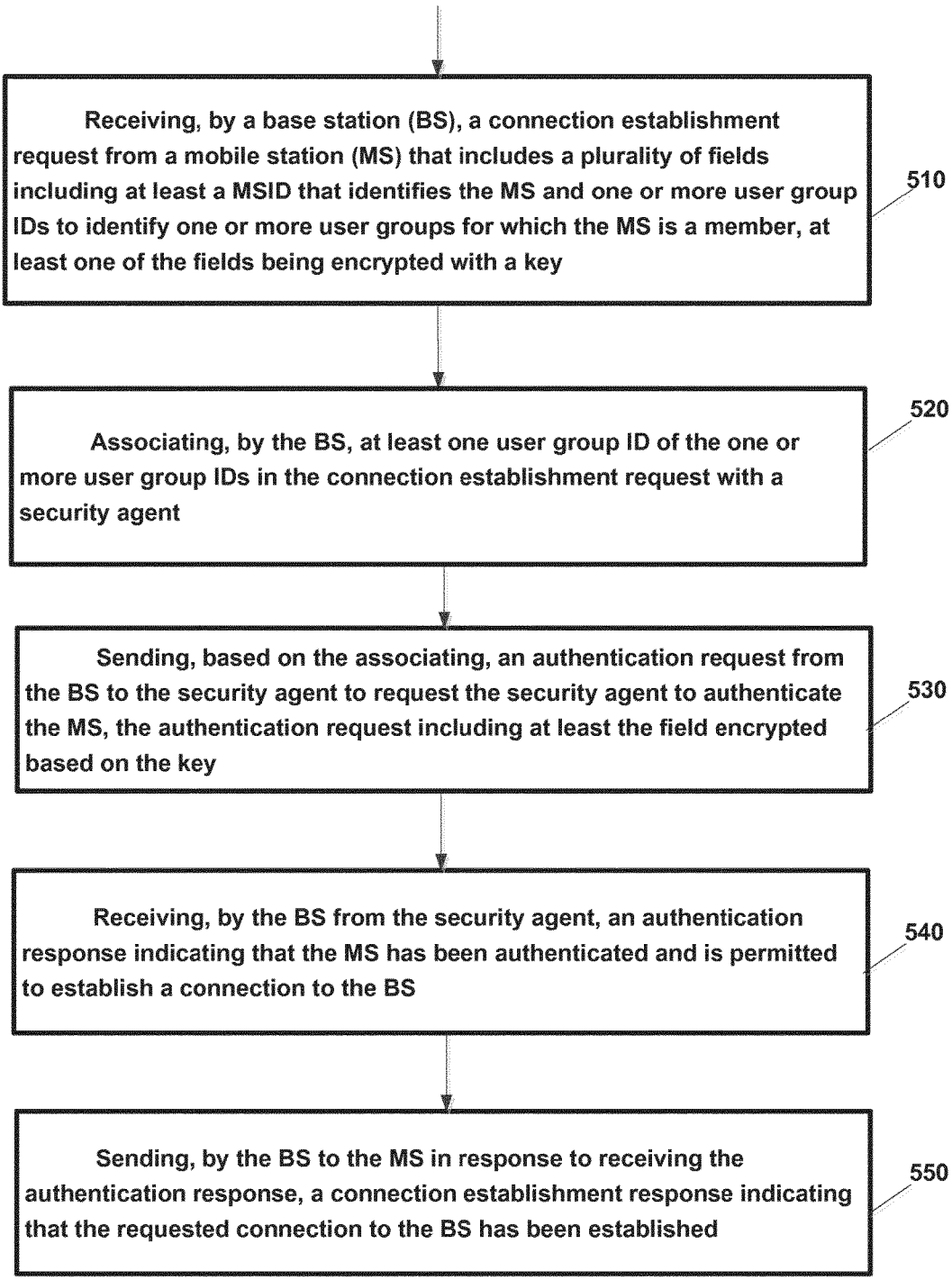
FIG. 5 is a flow chart illustrating operation of a base station (BS) according to another example implementation.

FIG. 5 is a flow chart illustrating operation of a base station (BS) according to another example implementation. At 510, a base station (BS) may receive a connection establishment request from a mobile station (MS) that includes a plurality of fields including at least a MSID that identifies the MS and one or more user group IDs to identify one or more user groups for which the MS is a member, at least one of the fields being encrypted with a key. At 520, the BS associates at least one user group ID of the one or more user group IDs in the connection establishment request with a security agent. At 530, the BS sends, based on the associating, an authentication request to the security agent to request the security agent to authenticate the MS, the authentication request including at least the field encrypted based on the key. At 540, the BS receives from the security agent an authentication response indicating that the MS has been authenticated and is permitted to establish a connection to the BS. At 550, the BS sends to the MS, in response to receiving the authentication response, a connection establishment response indicating that the requested connection to the BS has been established.

According to an example implementation, in the method of FIG. 5, the key includes a user group key associated with one or more user groups for which the MS is a member.

According to an example implementation, in the method of FIG. 5, the authentication request includes at least the MSID that has been encrypted based on the key.

According to an example implementation, in the method of FIG. 5, the key comprises a user group key associated with one or more user groups for which the MS is a member, wherein the sending the authentication request includes sending, based on the associating, the authentication request from the BS to the security agent to request the security agent to authenticate the MS, the authentication request including at least the MSID that has been encrypted based on the key, and wherein the authentication request includes at least the encrypted MSID.

According to an example implementation, in the method of FIG. 5, the MS includes a first MS, the method further including: detecting, by the BS a failure of an interface between the BS and a core network, and configuring a second MS to be the security agent for one or more device-to-device (D2D) wireless MSs.

According to an example implementation, in the method of FIG. 5, the connection establishment request from the MS includes a plurality of fields including at least a MSID encrypted with a user group key, one or more user group IDs encrypted with the user group key identifying one or more user groups for which the MS is a member, and a cause field.

According to an example implementation, in the method of FIG. 5, the security agent is implemented as a cluster head for a wireless D2D cluster.

According to an example implementation, in the method of FIG. 5, the security agent is a MS that is a security agent for a plurality of wireless D2D clusters.

According to an example implementation, in the method of FIG. 5, the security agent is a MS that is a security agent for one or more user groups of which the security agent is a member.

According to another example implementation, an apparatus may include at least one processor and at least one memory including computer instructions, when executed by the at least one processor, cause the apparatus to: receive, by a base station (BS), a connection establishment request from a mobile station (MS) that includes a plurality of fields including at least a MSID that identifies the MS and one or more user group IDs to identify one or more user groups for which the MS is a member, at least one of the fields being encrypted with a key, associate, by the BS, at least one user group ID of the one or more user group IDs in the connection establishment request with a security agent, send, based on the associating, an authentication request from the BS to the security agent to request the security agent to authenticate the MS, the authentication request including at least the field encrypted based on the key, receive, by the BS from the security agent, an authentication response indicating that the MS has been authenticated and is permitted to establish a connection to the BS, and send, by the BS to the MS in response to receiving the authentication response, a connection establishment response indicating that the requested connection to the BS has been established.

According to another example implementation, a computer program product is provided that includes a non-transitory computer-readable storage medium and storing executable code that, when executed by at least one data processing apparatus, is configured to cause the at least one data processing apparatus to perform a method including: receiving, by a base station (BS), a connection establishment request from a mobile station (MS) that includes a plurality of fields including at least a MSID that identifies the MS and one or more user group IDs to identify one or more user groups for which the MS is a member, at least one of the fields being encrypted with a key, associating, by the BS, at least one user group ID of the one or more user group IDs in the connection establishment request with a security agent, sending, based on the associating, an authentication request from the BS to the security agent to request the security agent to authenticate the MS, the authentication request including at least the field encrypted based on the key, receiving, by the BS from the security agent, an authentication response indicating that the MS has been authenticated and is permitted to establish a connection to the BS, and sending, by the BS to the MS in response to receiving the authentication response, a connection establishment response indicating that the requested connection to the BS has been established.

Figure 6:
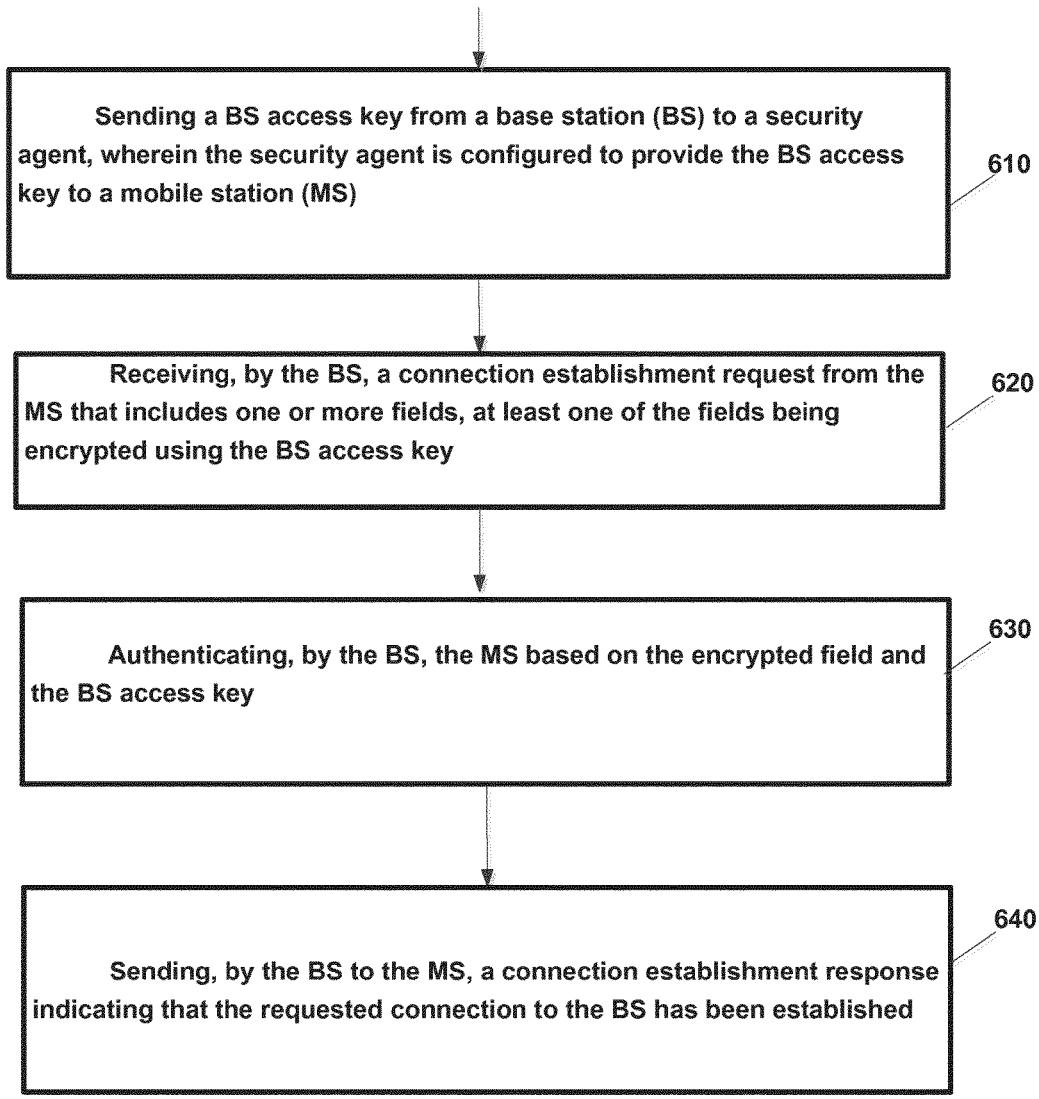
FIG. 6 is a flow chart illustrating operation of a base station (BS) according to another example implementation.

FIG. 6 is a flow chart illustrating operation of a base station (BS) according to another example implementation. At 610, a base station (BS) sends a BS access key to a security agent, wherein the security agent is configured to provide the BS access key to a mobile station (MS). At 620, the BS receives a connection establishment request from the MS that includes one or more fields, at least one of the fields being encrypted using the BS access key. At 630, the BS authenticates the MS based on the encrypted field and the BS access key. At 640, the BS sends to the MS a connection establishment response indicating that the requested connection to the BS has been established. According to an example implementation, in the method of FIG. 6, the connection establishment request from the MS includes one or more fields including a MSID for the MS and a cause field.

According to another example implementation, an apparatus may include at least one processor and at least one memory including computer instructions, when executed by the at least one processor, cause the apparatus to: send a BS access key from a base station (BS) to a security agent, wherein the security agent is configured to provide the BS access key to a mobile station (MS), receive, by the BS, a connection establishment request from the MS that includes one or more fields, at least one of the fields being encrypted using the BS access key, authenticate, by the BS, the MS based on the encrypted field and the BS access key, and send, by the BS to the MS, a connection establishment response indicating that the requested connection to the BS has been established.

According to another example implementation, a computer program product is provided that includes a non-transitory computer-readable storage medium and storing executable code that, when executed by at least one data processing apparatus, is configured to cause the at least one data processing apparatus to perform a method including: sending a BS access key from a base station (BS) to a security agent, wherein the security agent is configured to provide the BS access key to a mobile station (MS), receiving, by the BS, a connection establishment request from the MS that includes one or more fields, at least one of the fields being encrypted using the BS access key, authenticating, by the BS, the MS based on the encrypted field and the BS access key, and sending, by the BS to the MS, a connection establishment response indicating that the requested connection to the BS has been established.

Figure 7:
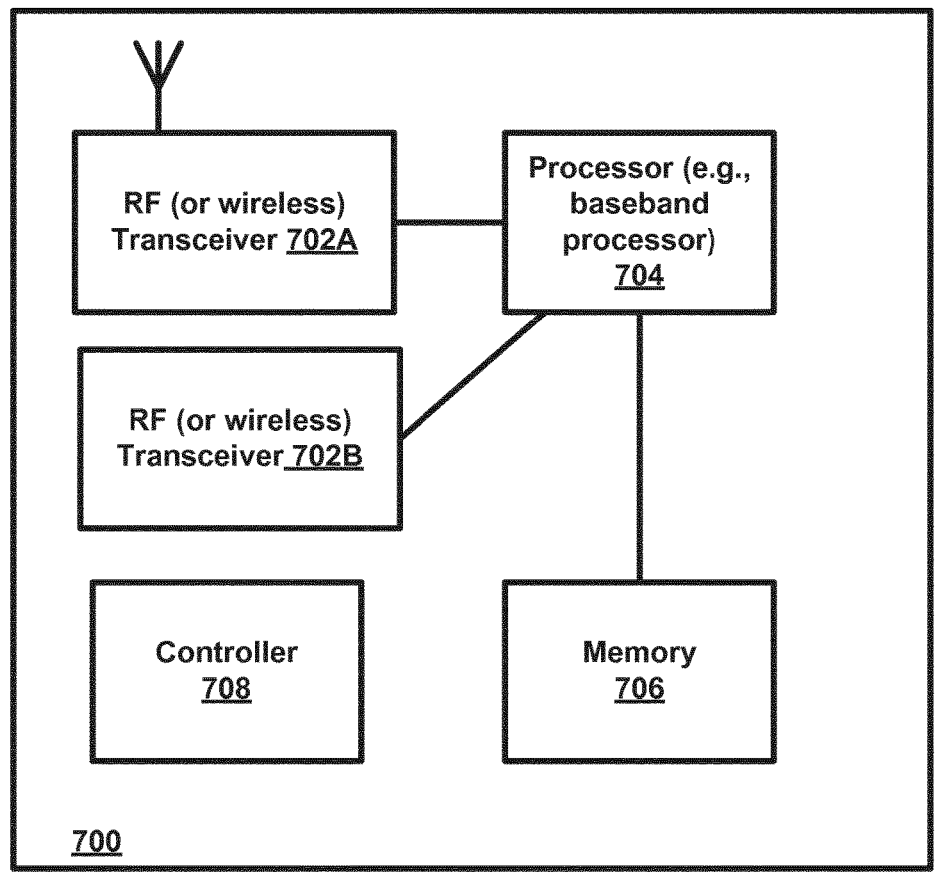
FIG. 7 is a block diagram of a wireless station (e.g., BS or MS) 700 according to an example implementation.

FIG. 7 is a block diagram of a wireless station (e.g., BS or MS) 700 according to an example implementation. The wireless station 700 may include, for example, two RF (radio frequency) or wireless transceivers 702A, 702B, where each wireless transceiver includes a transmitter to transmit signals and a receiver to receive signals. The wireless station also includes a processor 504 to execute instructions or software and control transmission and receptions of signals, and a memory 706 to store data and/or instructions.

Processor 704 may also make decisions or determinations, generate frames, packets or messages for transmission, decode received frames or messages for further processing, and other tasks or functions described herein. Processor 704, which may be a baseband processor, for example, may generate messages, packets, frames or other signals for transmission via wireless transceiver 702. Processor 704 may control transmission of signals or messages over a wireless network, and may receive signals or messages, etc., via a wireless network (e.g., after being down-converted by wireless transceiver 702, for example). Processor 704 may be programmable and capable of executing software or other instructions stored in memory or on other computer media to perform the various tasks and functions described above, such as one or more of the tasks or methods described above. Processor 704 may be (or may include), for example, hardware, programmable logic, a programmable processor that executes software or firmware, and/or any combination of these. Using other terminology, processor 704 and transceiver 702 together may be considered as a wireless transmitter/receiver system, for example.

In addition, referring to FIG. 7, a controller (or processor) 708 may execute software and instructions, and may provide overall control for the station 700, and may provide control for other systems not shown in FIG. 7, such as controlling input/output devices (e.g., display, keypad), and/or may execute software for one or more applications that may be provided on wireless station 700, such as, for example, an email program, audio/video applications, a word processor, a Voice over IP application, or other application or software.

In addition, a storage medium may be provided that includes stored instructions, which when executed by a controller or processor may result in the processor 704, or other controller or processor, performing one or more of the functions or tasks described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet. While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
   detecting, by a hardware processor of a base station (BS), a failure of an interface between the BS and a core network;
   sending, by the BS, a failure notification message to one or more mobile stations (MSs) of a cell indicating the failure of the interface between the BS and the core network;
   selecting, by the BS, one of the MSs to be a security agent (SA) to provide security-related services to one or more other MSs in response to the failure of the interface between the BS and the core network, wherein the security-related services authenticate the one or more MSs to connect to the BS; and
   sending a SA configuration message to the selected MS to configure the selected MS as a security agent to provide security-related services to one or more other MSs in response to the failure of the interface between the BS and the core network, the SA configuration message including a service identification identifying one or more services, one or more user group IDs identifying one or more user groups for which the MS has been configured as a security agent to perform the one or more identified services, and a BS access key to allow one or more other MSs to access or establish a connection with the BS.

2. The method of claim 1 further comprising:
   receiving, by the BS, a security agent (SA) notification from one or more of the MSs, the SA notification including at least a service profile identifying one or more services that the MS can perform for one or more device-to-device (D2D) MSs including the security-related services, and one or more user group IDs that identify one or more user groups of which the MS is a member.

3. The method of claim 2 wherein the security agent (SA) notification comprises a capability indication that indicates that the MS is capable of performing the one or more services identified by the service profile including the security-related services.

4. The method of claim 2 wherein the security agent (SA) notification comprises a SA notification that indicates that the MS has been preconfigured to perform the one or more services identified by the service profile.

5. The method of claim 2 wherein the service profile identifying one or more services that the MS can perform for one or more device-to-device (D2D) MSs identifies one or more of a cluster head service and the security-related services, wherein the cluster head service is provided for a D2D cluster, and the security-related services are provided for one or more D2D MSs.

6. The method of claim 1 wherein the service identification included in the SA configuration message identifies that the MS has been configured as a cluster head for one or more identified user groups.

7. The method of claim 1 wherein the service identification included in the SA configuration message identifies that the selected MS has been configured as a security agent to provide security-related services for one or more identified user groups.

8. The method of claim 1 further comprising:
   receiving at the BS from the selected MS a SA configuration confirm message confirming the configuration of the MS as a security agent to perform at least one of the services for one or more user groups.

9. The method of claim 1 further comprising:
   broadcasting, by the BS, a SA advertisement message to one or more MSs, the SA advertisement message identifying at least cell resources to be used by the selected security agent to transmit reference and/or beacon signals for synchronization and proximity discovery.

10. The method of claim 1 further comprising:
broadcasting, by the BS, a SA advertisement message to one or more MSs, the SA advertisement message identifying at least cell resources to be used by the selected security agent to transmit reference and/or beacon signals for synchronization and proximity discovery and one or more user group IDs that identify user groups associated with the reference signal resources.

11. The method of claim 1, wherein the selected MS comprises a first MS, the method further comprising:
receiving, by the BS, a connection establishment request from a second MS that includes one or more fields, at least one of the fields being encrypted using the BS access key;
authenticating the second MS based on the encrypted field and the BS access key;
sending, by the BS to the second MS, a connection establishment response indicating that the requested connection to the BS has been established.

12. The method of claim 1, wherein the selected MS comprises a first MS, the method further comprising:
receiving, by the BS, a connection establishment request from a second MS that includes a plurality of fields including at least a mobile statin identifier (MSID) and a user group for which the second MS is a member, at least one of the fields being encrypted using a user group key associated with the user group for which the second MS is a member;
associating the user group in the connection establishment request with the first MS;
sending, based on the associating, an authentication request from the BS to the first MS, the authentication request including at least the field encrypted based on the user group key;
receiving, by the BS from the first MS, an authentication response indicating that the second MS is authenticated and permitted to establish a connection to the BS; and
sending, by the BS to the second MS, a connection establishment response indicating that the requested connection to the BS has been established based on the authentication response.

13. An apparatus comprising at least one processor and at least one memory including computer instructions, when executed by the at least one processor, cause a base station (BS) at least to:
detect a failure of an interface between the BS and a core network;
send a failure notification message to one or more mobile stations (MSs) of a cell indicating the failure of the interface between the BS and the core network;
select one of the MSs to be a security agent (SA) to provide security-related services to one or more other MSs in response to the failure of the interface between the BS and the core network, wherein the security-related services authenticate the one or more MSs to connect to the BS; and
send a SA configuration message to the selected MS to configure the selected MS as a security agent to provide security-related services to one or more other MSs in response to the failure of the interface between the BS and the core network, the SA configuration message including a service identification identifying one or more services, one or more user group IDs identifying one or more user groups for which the MS has been configured as a security agent to perform the one or more identified services, and a BS access key to allow one or more other MSs to access or establish a connection with the BS.

14. The apparatus of claim 13, wherein the least one memory and the computer program instructions are configured to, with the at least one processor, cause the BS at least to:
receive a security agent (SA) notification from one or more of the MSs, the SA notification including at least a service profile identifying one or more services that the MS can perform for one or more device-to-device (D2D) MSs including the security-related services, and one or more user group IDs that identify one or more user groups of which the MS is a member.

15. The apparatus of claim 14, wherein the security agent (SA) notification comprises a capability indication that indicates that the MS is capable of performing the one or more services identified by the service profile or a SA indication that indicates that the MS is capable of performing the one or more services identified by the service profile.

16. The apparatus of claim 13, wherein the service identification included in the SA configuration message identifies that the selected MS has been configured as a cluster head for one or more identified user groups or that the selected MS has been configured as a security agent for one or more identified user groups.

17. An apparatus comprising at least one processor and at least one memory including computer instructions, when executed by the at least one processor, cause a mobile station (MS) at least to:
receive, from a base station (BS), a failure notification message indicating a failure of a BS-core network interface;
send, to the BS, a security agent (SA) notification, the SA notification including at least a mobile station identifier (MSID) identifying the MS, a service profile identifying one or more services that the MS can perform including security-related services, and one or more user group IDs that identify one or more user groups of which the MS is a member, wherein the security-related services authenticate the one or more MSs to connect to the BS; and
receive, from the BS, a SA configuration message including a service identification indicating that the MS has been selected as a security agent to provide security-related services to one or more other MSs in response to the failure of the BS-core network interface, one or more user group IDs identifying one or more user groups for which the MS has been configured as a security agent to perform the security-related services, and a BS access key to allow one or more other MSs to access or establish a connection with the BS.

18. The apparatus of claim 17 wherein the security agent (SA) notification comprises a capability indication that indicates that the MS is capable of performing the one or more services identified by the service profile including the security-related services.

19. The apparatus of claim 17, wherein the least one memory and the computer program instructions are configured to, with the at least one processor, cause the MS at least to:
reconfigure the MS from a cellular or infrastructure mode to operate as a security agent to provide the security-related services in a D2D wireless mode; and wherein the security agent (SA) notification comprises a SA notification that indicates that the MS has been preconfigured to perform the one or more services identified by the service profile including the security-related services.

20. The apparatus of claim 17, wherein the MS comprises a first MS, wherein the least one memory and the computer program instructions are configured to, with the at least one processor, cause the first MS at least to:
receive a BS access key request from a second MS, the BS access key request including a plurality of fields including at least a MSID and one or more user group IDs for user groups for which the second MS is a member, at least one of the fields being encrypted based upon a user group key;
authenticate the second MS based on at least the encrypted field; and
send to the second MS based on the authenticating, an access key response to the second MS including the BS access key to allow the second MS to establish a connection to the BS based on the BS access key.

* * * * *